Sept. 7, 1937.  J. H. VICTOR  2,092,231
SKELETON METAL-BACKED GASKET WITH WATER PASSAGES
Filed Aug. 26, 1935  2 Sheets-Sheet 1

JOHN H. VICTOR
INVENTOR

PER *Albert J. Fihe*

ATTORNEY

JOHN H. VICTOR
INVENTOR

PER *Albert J. Fihe*

ATTORNEY

Patented Sept. 7, 1937

2,092,231

UNITED STATES PATENT OFFICE 2,092,231

SKELETON METAL-BACKED GASKET WITH WATER PASSAGES

John H. Victor, Wilmette, Ill., assignor to Victor Manufacturing & Gasket Company, Chicago, Ill., a corporation of Illinois Application August 26, 1935, Serial No. 37,825

3 Claims. (Cl. 288—1)

This invention relates to an improved gasket, particularly for high compression engines, and the present application constitutes a continuation in part of this same applicant's application for patent on "Skeleton metal-backed gaskets", Serial No. 706,932, filed January 17, 1934.

This particular application pertains to the structure shown in Figure 4 of the aforesaid parent application and relates especially to the production of a cylinder-head gasket wherein certain portions of the gasket are completely cut away to allow a free passage of circulating water or other cooling medium into comparatively large spaces in the gasket itself and to thereby provide for a better cooling of the cylinder-head and block.

The application also discloses a further improvement in gaskets of this type wherein a more satisfactory form of channel between adjacent water holes and the like is provided while, at the same time, retaining all the advantageous features of the skeleton gaskets as disclosed in the original application.

Another object of the invention is to provide a combination of metal and packing material, such as steel and asbestos or other similar elements which will produce a light but strong and serviceable gasket, and which shall, at the same time, by virtue of its skeletonized structure, provide a better cooling efficiency.

Other and further important objects of the invention will be apparent from the disclosures in the accompanying drawings and following specification.

The invention, in a preferred form, is illustrated in the drawings and hereinafter more fully described.

Figure 1:
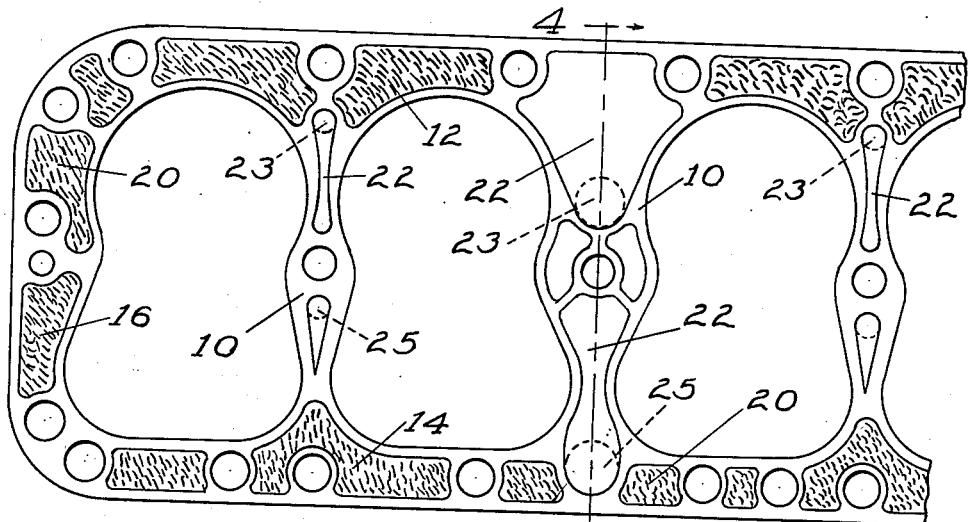
Figure 1 is a plan view of a portion of the high compression gasket of this invention, showing particularly the novel spaces for additional water circulation.

The reference numeral 10 indicates generally the backing for the improved gasket of this invention, the same being preferably composed of some sheet metal such as steel or the like, this backing being cut away as illustrated at 12, 14, 16, etc. to provide areas whereby the packing material 20 which may be asbestos or the like is allowed to contact corresponding and adjacent portions of the cylinder-head and block of the motor, and, as described in the parent application, this provides for a greater resiliency of the gasket itself and also a better and non-leaking fit of the gasket between the cylinder-head and block.

Figure 3:
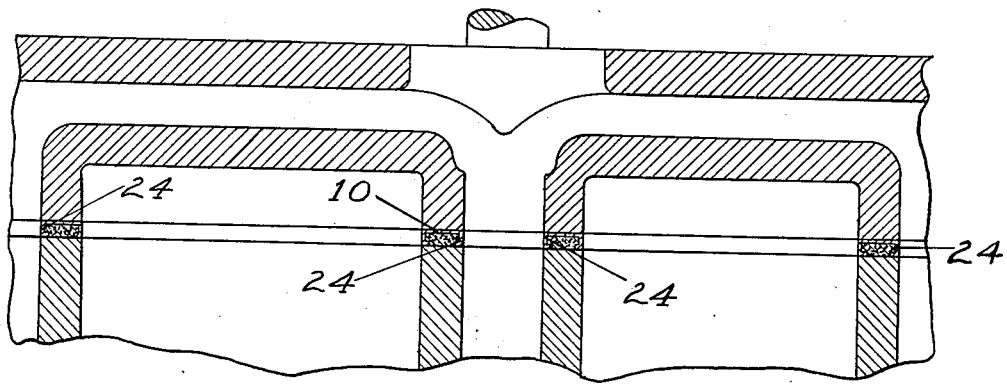
Figure 3 is a sectional view showing a gasket of this invention in position between cylinder-head and block.
Figure 4:
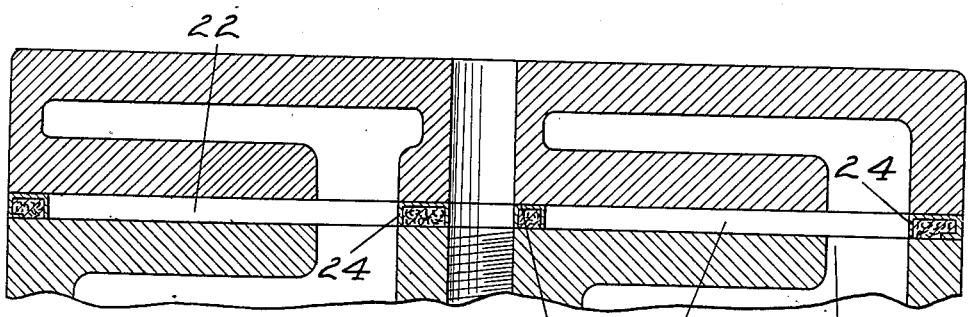
Figure 4 is a sectional view showing a portion of the gasket of Figure 1 in position between the cylinder-head and block and taken on the line 4—4 of Figure 1.

As best shown at 22, certain portions of the packing are omitted so as to provide open spaces whereby the cooling water or other circulating medium is allowed to flow from one water opening 23 in the block or head to another such as 25, thereby providing a greater cooling area for such adjacent portions of the block and head. The metal portion of the gasket adjacent these open areas may be bent down to form protective flanges, if desired, as shown at 24 in Figure 3 or may be simply cut away, leaving the edge of the packing material in contact with the cooling medium. In this last case, the packing material is preferably impregnated with some waterproofing substance.

Figure 2:
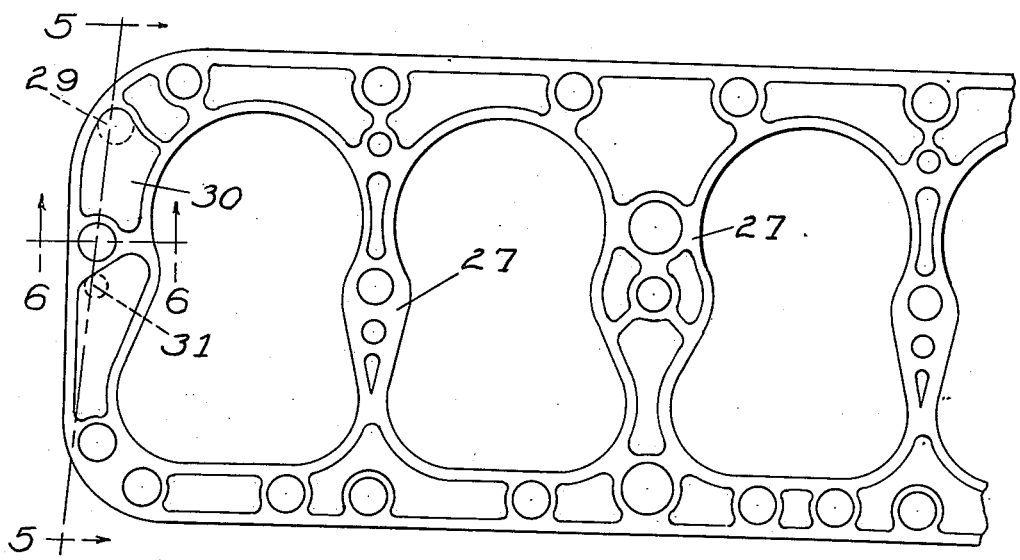
Figure 2 is a plan view of a modified form of gasket, illustrating a further improved means for providing channels for connecting two or more of the water circulating openings.
Figure 6:
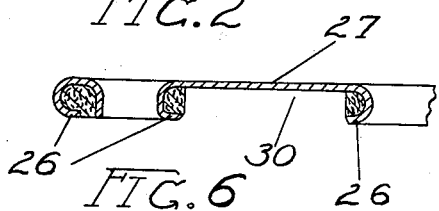
Figure 6 is a section on the line 6—6 of Figure 2.
Figure 5:
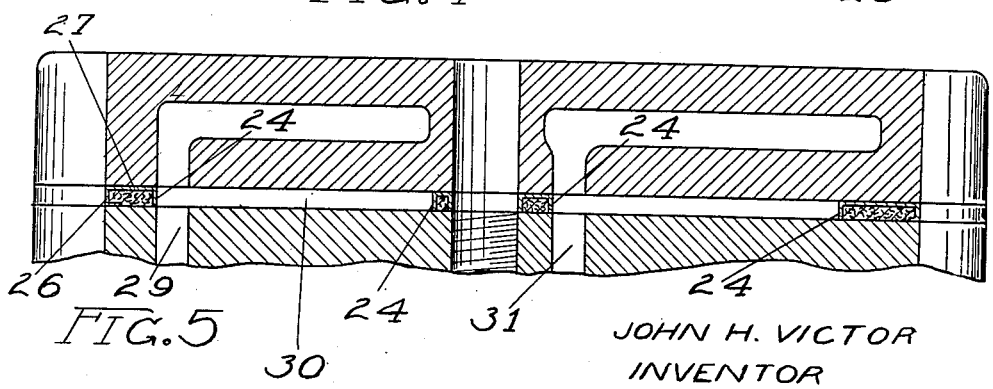
Figure 5 is a sectional view taken on the line 5—5 of Figure 2 and showing the gasket of this figure in position between the cylinder-head and block.

As illustrated in Figures 2 and 5, the entire gasket may be skeletonized with the packing material held only against the corresponding portions of the cut-away back 27, this holding being accomplished by the turned-down flanges 26 of the back, which will also act to prevent wicking of the asbestos or other packing by contact of the circulating water therewith whenever the water openings such as 29 and 31 are joined by passages such as illustrated at 30.

The regulation of the thickness and compression of the gasket in use has already been fully described in the aforesaid parent application, this particular application being definitely directed to the construction of the additional water passages and the extra cooling effect thereby obtained.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In an internal combustion engine, including a cylinder head and block, and a gasket between the head and block, said gasket comprising a metal back, and a resilient packing associated with the back, the gasket having service openings therethrough, channels in the gasket for connecting certain adjacent water circulating openings of the head and block to each other, and further channels forming dead air spaces, all of said channels defined by the motor block or head on one face, the back of the gasket on another face, and sides of the packing on the edges.

2. A gasket, comprising a sheet of asbestos having service openings therethrough, a metallic back secured to one face of said sheet, certain portions of the back being cut away to expose the asbestos and certain portions of the asbestos being cut away while retaining the back over such areas, and flanges integral with the back extending up and around the outer edges of the asbestos sheet and the service openings, the cut-away portions forming channels for the circulation of a cooling medium between adjacent water openings in the gasket, said channels being located in areas between adjacent cylinder openings and also between cylinder openings and the outer flanges of the gasket.

3. A gasket, comprising a sheet of asbestos having service openings therethrough, a metallic back secured to one face of said sheet, certain portions of the back being cut away to expose the asbestos and certain portions of the asbestos being cut away while retaining the back over such areas, and flanges integral with the back extending up and around the outer edges of the asbestos sheet and all the openings therethrough, the entire surface of the asbestos beyond said turned-over flanges being exposed on that face of the gasket, the cut-away portions forming channels for the circulation of a cooling medium between adjacent water openings in the gasket, said channels being located in areas between adjacent cylinder openings and also between cylinder openings and the outer flanges of the gasket.

JOHN H. VICTOR.